(12) United States Patent
Lee et al.

(10) Patent No.: US 10,884,478 B2
(45) Date of Patent: Jan. 5, 2021

(54) ASYNCHRONOUS STATE MACHINE FOR MANAGING DEEP SLEEP STATE

(71) Applicant: Microsoft Technology Licensing, LLC, Redmond, WA (US)

(72) Inventors: Yen Ying Lee, Kirkland, WA (US); Gene Robert Obie, Coupeville, WA (US); Jay A. Kuehny, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 16/148,396

(22) Filed: Oct. 1, 2018

(65) Prior Publication Data

US 2020/0103955 A1    Apr. 2, 2020

(51) Int. Cl.
*G06F 1/32*    (2019.01)
*G06F 1/3234*    (2019.01)
*G06F 1/3206*    (2019.01)

(52) U.S. Cl.
CPC .......... *G06F 1/3234* (2013.01); *G06F 1/3206* (2013.01)

(58) Field of Classification Search
CPC .............................. G06F 1/3234; G06F 1/3206
See application file for complete search history.

(56) References Cited

U.S. PATENT DOCUMENTS

| 5,546,590 | A | 8/1996 | Pierce |
| 6,665,802 | B1 | 12/2003 | Ober |
| 7,061,272 | B2 | 6/2006 | Wilkes et al. |
| 8,635,481 | B1 | 1/2014 | Lachwani |
| 8,853,892 | B2 | 10/2014 | Fells et al. |
| 9,780,644 | B1* | 10/2017 | Tapadia ................... G06F 1/10 |
| 9,971,608 | B1 | 5/2018 | Venkatasamy et al. |
| 2003/0070013 | A1 | 4/2003 | Hansson |
| 2007/0288778 | A1 | 12/2007 | Zhuang et al. |
| 2011/0161699 | A1* | 6/2011 | Lin ....................... G06F 1/3212 713/320 |

(Continued)

OTHER PUBLICATIONS

"WP-1001 Asynchronous State Machine vs MCU", Retrieved From: https://web.archive.org/web/20170707051740/http:/www.silego.com/uploads/Products/product_454/details/WP-1001%20Asynchronous%20State%20Machine%20vs%20MCU.pdf, Jul. 7, 2017, 5 Pages.

(Continued)

*Primary Examiner* — Stefan Stoynov
(74) *Attorney, Agent, or Firm* — Ray Quinney & Nebeker P.C.; Paul N. Taylor

(57) ABSTRACT

An asynchronous state machine (ASM) for managing deep sleep state of a device and related methods are described. One method includes the ASM automatically detecting a request to wake up the device based on either a change in a status of a power user-interface element associated with the device or upon a detection of an attachment of an external power source to the device. The method further includes the ASM automatically initiating a wake-up sequence including turning on a battery pack associated with the device. The method further includes the ASM automatically detecting whether a power management function associated with the device is enabled and automatically transferring control of a remaining portion of the wake-up sequence to the power management function and the ASM passing the status of the power user-interface element to the power management function as needed.

20 Claims, 9 Drawing Sheets

(56) References Cited

U.S. PATENT DOCUMENTS

2016/0334857 A1* 11/2016 Hobson ................. G06F 1/3287
2017/0160790 A1    6/2017 Obie et al.
2018/0260019 A1    9/2018 Kim et al.

OTHER PUBLICATIONS

Chow, et al., "Low Power Realization of Finite State Machines—A Decomposition Approach", In Journal of ACM Transactions on Design Automation of Electronic Systems, vol. 1, Issue 3, Jul. 1996, pp. 315-340.
"International Search Report and Written Opinion Issued in PCT Application No. PCT/US2019/051370", dated Jan. 7, 2020, 16 Pages.

* cited by examiner

ASYNCHRONOUS STATE MACHINE FOR MANAGING DEEP SLEEP STATE

BACKGROUND

Power management techniques used for portable battery-powered devices, such as laptops and tablets, require the battery to be providing sufficient power to power management functions even when the device is in the "OFF" state. There is a need for systems and methods for managing power consumption in devices, including when they are in the "OFF" state.

SUMMARY

In one example, the present disclosure relates to a method for waking up a device from a deep sleep state using an asynchronous state machine (ASM) associated with the device. The method may include the ASM automatically detecting a request to wake up the device based on either a change in a status of a power user-interface element associated with the device or upon a detection of an attachment of an external power source to the device. The method may further include in response to the request to wake up the device, the ASM automatically initiating a wake-up sequence including turning on a battery pack associated with the device. The method may further include the ASM automatically detecting whether a power management function associated with the device is enabled and if the power management function is not enabled then the ASM enabling the power management function. The method may further include the ASM automatically transferring control of a remaining portion of the wake-up sequence to the power management function and the ASM passing the status of the power user-interface element to the power management function if the detecting the request to wake up the device is based on the change in the state of the power user-interface element associated with the device.

In another example, the present disclosure relates to an asynchronous state machine (ASM) associated with a device, the ASM configured to wake up the device from a deep sleep state. The ASM may further be configured to automatically detect a request to wake up the device based on either a change in a status of a power user-interface element associated with the device or upon a detection of an attachment of an external power source to the device. The ASM may further be configured to, in response to the request to wake up the device, automatically initiate a wake-up sequence including turning on a battery pack associated with the device. The ASM may further be configured to automatically detect whether a power management function associated with the device is enabled and if the power management function is not enabled then enable the power management function. The ASM may further be configured to automatically transfer control of a remaining portion of the wake-up sequence to the power management function and pass the status of the power user-interface element to the power management function if the detecting the request to wake up the device is based on the change in the state of the power user-interface element associated with the device.

In yet another example, the present disclosure relates to a method entering a deep sleep state using an asynchronous state machine (ASM) associated with a device. The method may further include the ASM automatically detecting a condition including both no power supply being attached to the device and a state of the device being a lowest possible power state that a power management function associated with the device is configured to manage. The method may further include, in response to a detection of the condition, the ASM automatically disabling voltage supply to the power management function and asserting a signal to prevent the power supply from providing a voltage to the device even when the power supply is attached to the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to methods and systems for including an asynchronous state machine (ASM) for managing deep sleep state. Certain examples relate to an ASM that responds to external inputs to either place a system or a device into a deep sleep state or to wake the system or the device from the deep sleep state. Many existing devices have limited battery shelf life since they do not have the architecture necessary to place the system in a sufficiently low power state. Units in storage or shipment which have exceeded the shelf life will typically lose system time clock data (RTC data) and will require attachment of an external power supply unit (PSU) to re-charge the device before usage. Manufacturers may specify shelf life and they will need to control the actual shipping and storage shelf life times for the device. Once the actual shelf life exceeds the specified shelf life of the device, it will either need to be returned to the factory for refurbishment or it will require the batteries to be charged in order to maintain the desired behaviors. While some devices may provide power management functionality to manage the device, the power management functionality can drain the battery resulting in a shorter shelf life.

Examples described in the present disclosure address such problems, including the problem of excess battery discharge when the device is in the "OFF" state by using an asynchronous state machine (ASM) that can place the device in a deep sleep state. The deep sleep state may correspond to a very low power state. Thus, the battery may stay charged even during shipment and storage until the user opens the package containing the device. This may advantageously allow the user to have the desired out of box customer experience of being able to power up the device without having to attach the power supply cable to the device.

In certain examples, the ASM can transition to this deep sleep state when the ASM detects a prolonged idling period or a signal from the main system processor, leaving the ASM and the system real time clock (RTC) the only electronics that are powered in a device. While in this deep sleep state, the ASM may monitor for wake events and initiate a power on sequence to provide power to the rest of the system when, as an example, a button press is detected or upon external power supply unit (PSU) attachment.

The ASM may also act as an auxiliary fault monitor that can detect under-voltage, over-temperature, excessive current draw or other abnormal conditions in the system and can respond with an immediate controlled power down. Additionally, the ASM may implement user hard reset features (system power cycle) and other debug features which may have been traditionally implemented with separate discrete hardware and software.

Figure 1:
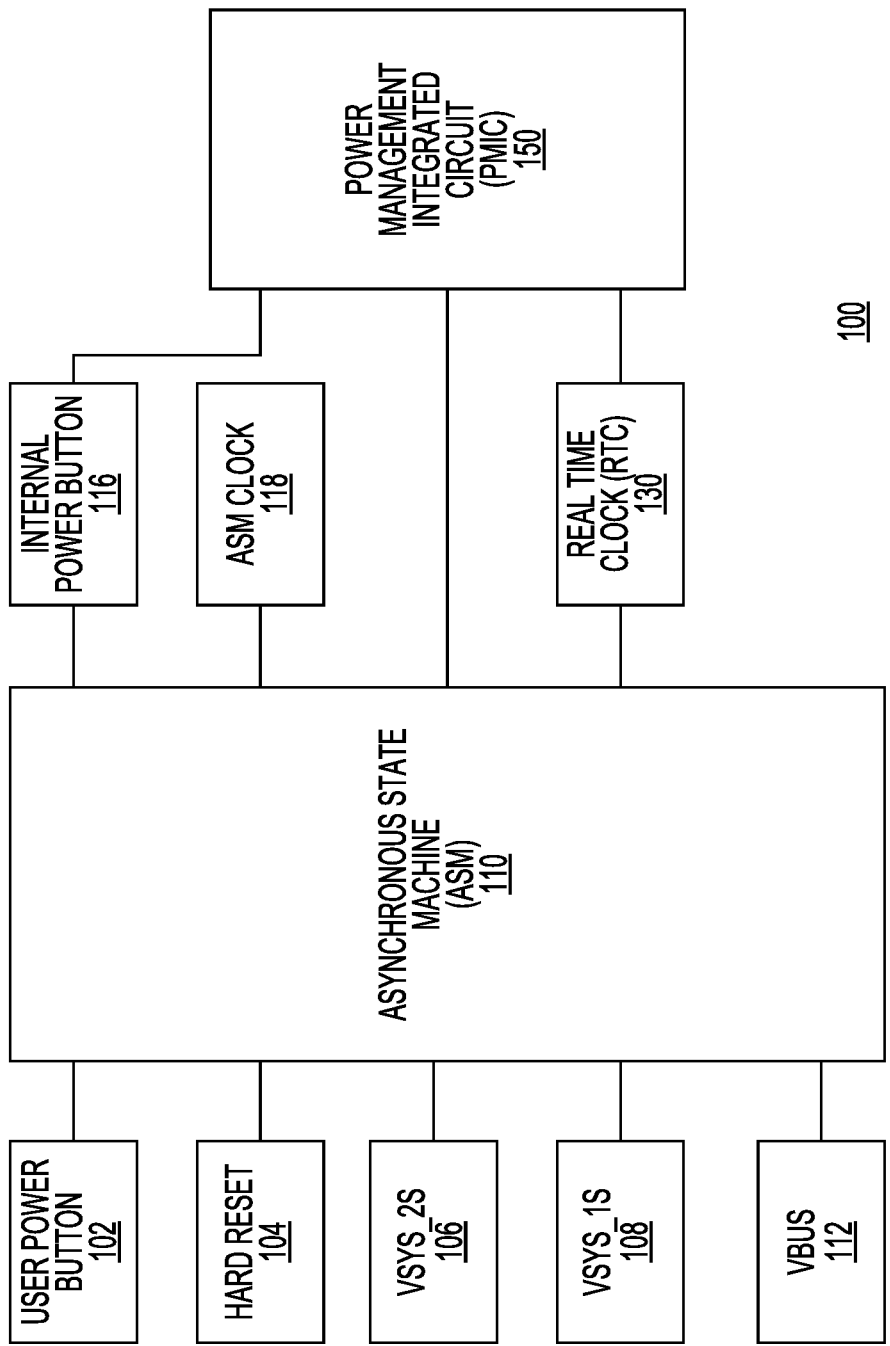
FIG. 1 shows a power management system including an asynchronous state machine (ASM) in accordance with one example.

FIG. 1 shows a power management system 100 in accordance with one example. Power management system 100 may be included in any battery-powered device that may require a deep sleep state. Power management system 100 may include an asynchronous state machine (ASM) 110 coupled to a power management integrated circuit (PMIC) 150. ASM 110 may be implemented with logic gates and a programmable state machine. ASM 110 may be a one-time programmable mixed signal integrated circuit, a Field Programmable Gate Array (FPGA), or another type of programmable logic circuit. ASM 110 may include hardware-implemented look-up tables, flip-flops, analog comparators, and timers. The use of such components may advantageously result in a low power solution. ASM 110 may work in conjunction with PMIC 150 and a battery monitor (e.g., a gas gauge integrated circuit). PMIC 150 may provide additional power management functions and may be replaced by an embedded controller that may provide similar power management functions.

Power management system 100 may further include pins or other types of input interface elements configured to receive inputs (internal or external) and to provide outputs (internal or external). As an example, user power button 102 may receive a signal in response to the pressing of the power button of the device. The signal to user power button 102 may also come from a voice command, a gesture, or some other type of input to the device that provides the same functionality as the power button. Hard reset 104 may receive a hard reset input signal, which may be an internally generated input or an external input. VSYS_2S 106 may relate to the power rail associated with the battery voltage. VSYS_1S 108 may relate to the voltage of the main power rail for the device that includes power management system 100. VBUS 112 may relate to the voltage, representing an attachment of a power supply unit to the device including power management system 100. Power management system 100 may further include an internal power button output 116 that may be used by ASM 110 to provide a value corresponding to a status of user power button 102 to PMIC 150. Power management system 100 may further include an ASM clock 118, which may be an internal oscillator configured to provide clock signals to ASM 110. In this example, ASM clock 118 is configured to provide a clock input only to ASM 110. In this example, ASM clock 118 is configured to not provide a clock to ASM 110 and stay in a power down mode during the deep sleep state. ASM clock 118 is configured to start providing the clock to ASM 110 upon receiving a control signal from ASM 110. Thus, in this example, ASM clock 118 is configured to be in an autopilot mode. Power management system 100 may further include a real time clock 130 that may be configured to maintain the real time and provide clock signals to ASM 110 and PMIC 150, as needed. Although FIG. 1 shows certain components of power management system 100 that are arranged in a certain manner, power management system 100 may include additional or fewer elements that may be arranged differently.

Figure 2:
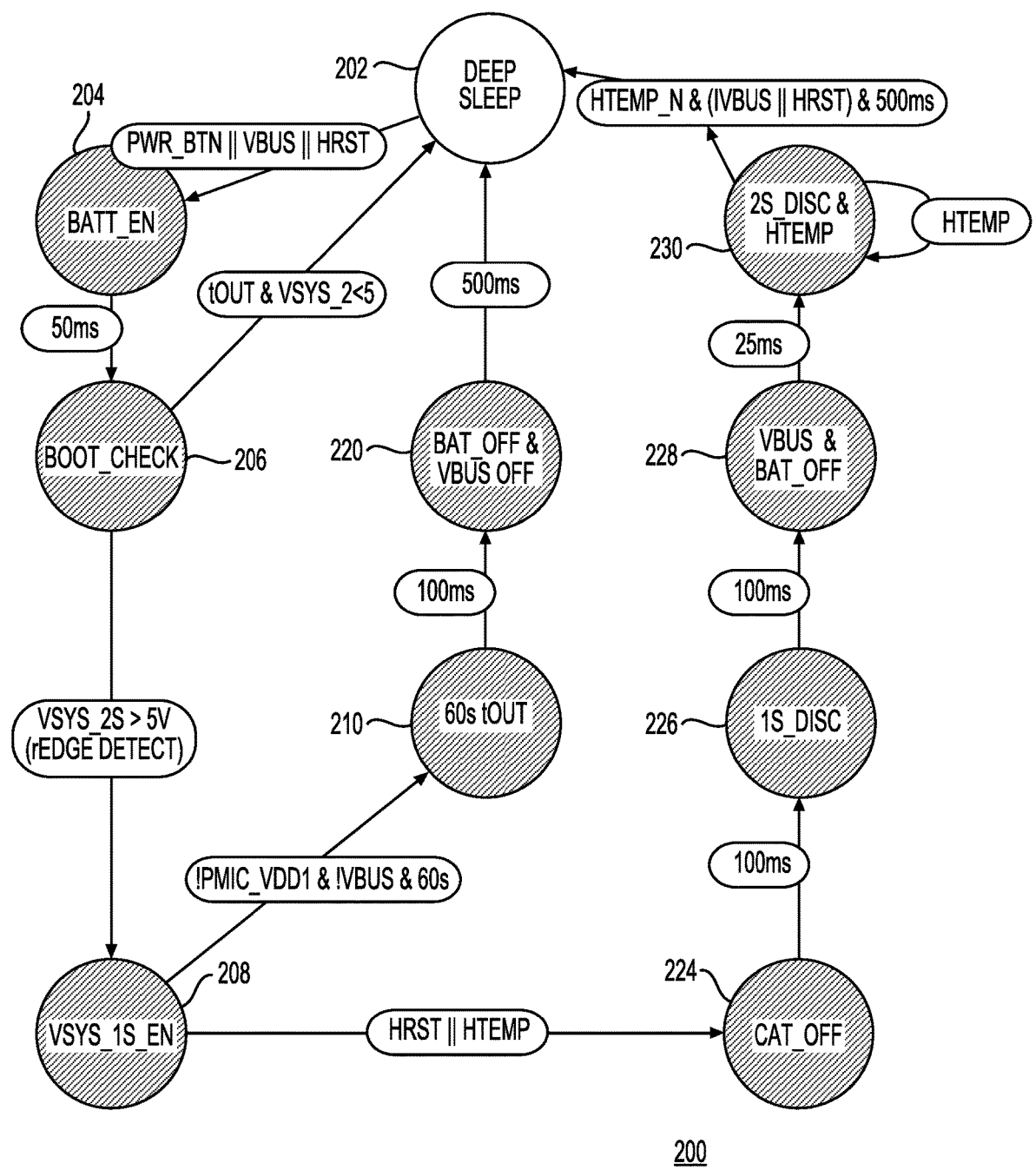
FIG. 2 shows a state machine diagram illustrating transitions of the states of the ASM in accordance with one example.

FIG. 2 shows a state machine diagram 200 illustrating transitions of the states of ASM 110 in accordance with one example. State 202 corresponds to the deep sleep state. In one example, state 202 may relate to a state in which only ASM 110 and RTC 130 are powered using a battery pack associated with a device that includes power management system 100. Since ASM 110 and RTC 130 drain a relatively small amount of current to function, this may advantageously allow the device to stay in the deep sleep state for extended periods of time without draining the battery. In one example, deep sleep state may correspond to a state in which the device incorporating power management system 100 may be shipped from a seller of the device to a buyer of the device or vice versa. ASM 110 may enter the deep sleep state (state 202) when the device incorporating power management system 100 is shutdown. In this example, shutdown may correspond to a scenario when the power supply unit is detached, and a loss of power to the system-on-chip (SoC) incorporating ASM 110 is detected for a certain threshold of time (e.g., 60 seconds). Additional details relevant to entry and exit out of state 202 are provided with respect to timing diagrams described later.

With continued reference to FIG. 2, ASM 110 may transition from state 202 to state 204 (shown as BATT_EN in FIG. 2) when any of the following three events occur: (1) The power button is pressed (or a signal similar to power button being pressed is received), (2) power supply unit is attached to the device including power management system 100 (e.g., this may relate to detecting the voltage provided by the PSU on the VBUS rail by ASM 110), or (3) a hard resent (HRST) signal is received by ASM 110. The signal indicating a request to wake up may also result in the exit from state 202. This signal may be generated in response to the user pressing the power button, the user providing an audio command, the user providing an input via some other interface means (e.g., a touch sensor), a real time clock signal, a hall sensor trigger, or some other type of trigger. State 204 corresponds to a state in which the battery pack is enabled by ASM 110. Next, after a selected time period (e.g., 50 ms), ASM 110 may transition to state 206 (shown as BOOT_CHECK in FIG. 2). State 206 may correspond to ASM 110 checking for the minimum boot voltage by detecting whether the device has sufficient energy to power up the VSYS_1S rail and the remaining platform corresponding to the device. This may include sampling the battery voltage. Thus, in state 206 if the battery rail voltage (e.g., VSYS_2S) stays below a certain voltage (e.g., 5 volts) for a certain selected amount of time (e.g., tOUT), ASM 110 may transition back to state 202 (the deep sleep state).

Still referring to FIG. 2, next, ASM 110 may transition from state 206 (BOOT_CHECK) to state 208 (shown as VSYS_1S_EN in FIG. 2) if during the selected amount of time (e.g., tOUT), the battery rail voltage (e.g., VSYS_2S) exceeds 5 volts. In state 208, ASM 110 may enable the voltage rail (e.g., VSYS_1S) used to supply power to PMIC 150. In one example, at this state ASM 110 may pass the control of the power management functions to PMIC 150 and yet remain in a mode where it can monitor certain conditions that may result in ASM 110 exiting from state 208.

With continued reference to FIG. 2, ASM 110 may transition from state 208 to state 210 or state 224. The transition to state 210 may eventually lead to ASM 110 transitioning to the deep sleep state (state 202). When in state 208, ASM 110 may monitor the state of voltage (e.g., VDD1) applied to PMIC 150 and the state of the voltage (VBUS) available to the device via a power supply unit. In state 208, ASM 110 detects no voltage being applied to PMIC 150 and no voltage available via the power supply unit, then ASM 110 may transition to state 210 (e.g., 60 seconds tOUT). After expiration of a predetermined time (e.g., 60 seconds), then another 100 ms, ASM 110 may transition from state 210 to state 220 (BAT_OFF and VBUS_OFF). After the expiration of another 500 ms, ASM 110 may transition to the deep sleep state (state 202). Alternatively, out of state 208, ASM 110 may transition to state 224 (CAT_OFF). Transition to this state may occur in response to hardware reset (HRST) signal or a high temperature (HTEMP) signal. Transition to state 224 may also initiate ultimate transition into the deep sleep state (state 202). After an expiration of a selected time (e.g., 100 ms), ASM 110 may transition to state 226 (1S_DISC), in which ASM 110 may assert a signal that initiates the discharging of the voltage rail (VSYS_1S) for supplying voltage to PMIC 150. After an expiration of a selected time (e.g., 100 ms), ASM 110 may transition to state 228 (VBUS & BAT_OFF). After an expiration of a selected time (e.g., 25 ms), ASM 110 may transition to state 230 (2S-DISC & HTEMP), in which ASM 110 may assert a signal that initiates the discharging of the battery voltage rail (VSYS_2S). In state 230, ASM 110 may also check a status of the HTEMP signal to determine whether the high temperature condition associated with a hot spot of the device is still present. Once the HTEMP signal clears, and no power supply voltage (VBUS) is detected, and after the expiration of another selected time (e.g., 500 ms), ASM 110 may transition to the deep sleep state (state 202). Although FIG. 2 shows an example with a specific number of states with specific transitions, ASM 110 may include additional or fewer states and other transitions.

Figure 3:
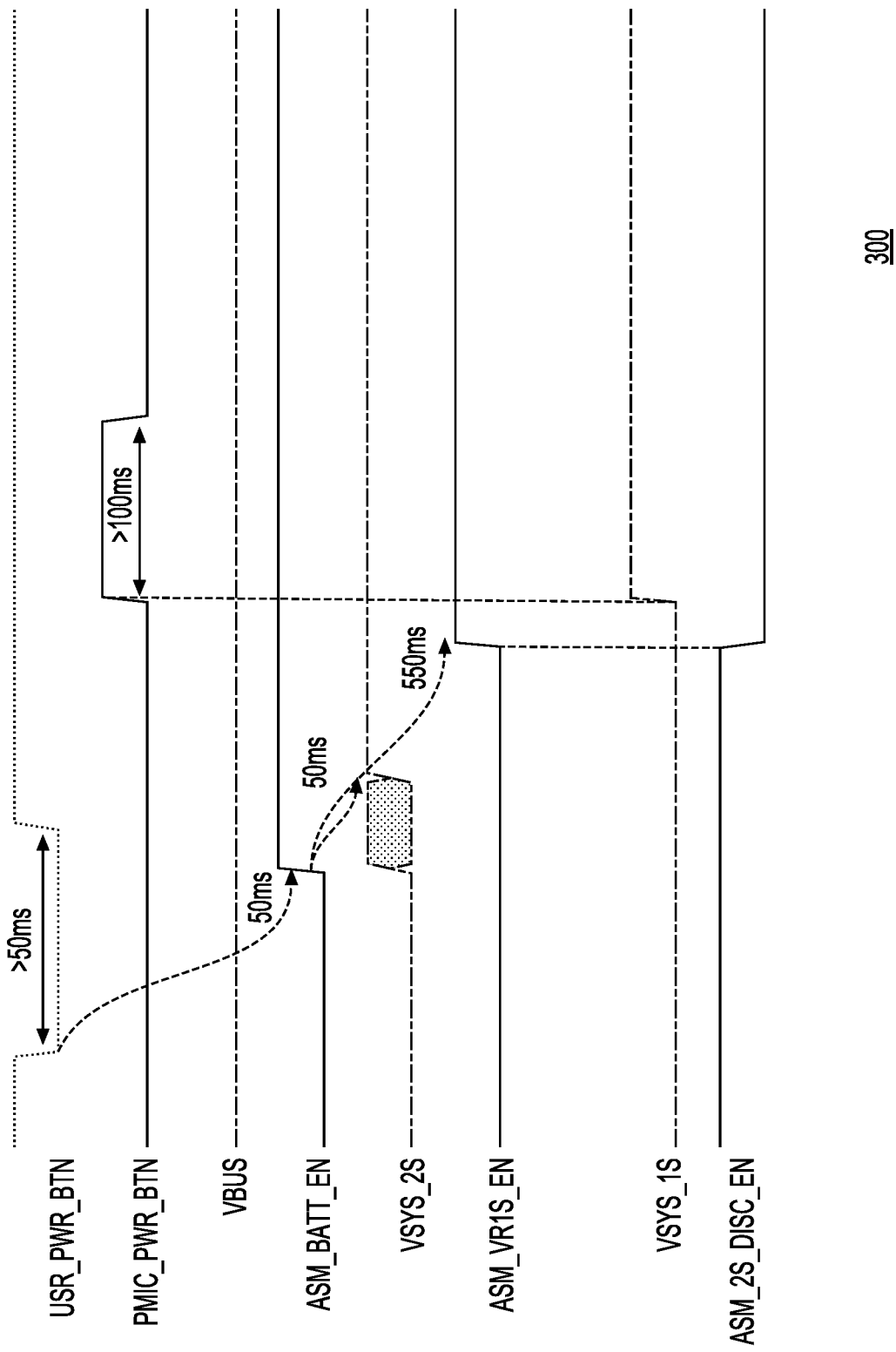
FIG. 3 shows an example timing diagram of the various signals associated with the transition of the ASM from out of the deep sleep state.

FIG. 3 shows an example timing diagram 300 of the various signals associated with the transition of ASM 110 from out of the deep sleep state (e.g., state 202 of FIG. 2) in response to a signal associated with the power button of the device. In this example, in response to the USR_PWR_BTN signal, ASM 110 may assert ASM_BATT_EN signal to enable the battery pack associated with the device. In this example, this signal may be received via user power button 102 of FIG. 1. As shown in FIG. 3, the ASM_BATT_EN signal may be asserted in about 50 ms. After waiting a selected amount of time (e.g., 500 ms), if the battery voltage (VSYS_2S) is determined to be greater than a selected minimum voltage, then ASM 110 may assert the ASM_VR1S_EN signal to enable the voltage rail (VSYS_1S) for PMIC 150 and at the same time ASM 110 may disable the battery voltage discharger by de-asserting the ASM_2S_DISC_EN signal. ASM 110 may also pass the status of the user power button 102 to PMIC 150 by asserting the PMIC_PWR_BTN signal. In this example, the PMIC_PWR_BTN signal is not asserted until the voltage rail (VSYS_1S) is enabled such that PMIC 150 is powered on. Although not shown in FIG. 3, if after a wait of 500 ms, the battery voltage (VSYS_2S) does not exceed the selected minimum voltage, then ASM 110 may de-assert the ASM_BATT_EN signal and may keep the ASM_2S_DISC_EN signal asserted. Although FIG. 3 describes the signals by referring to certain selected time periods, shorter or longer time periods may be used.

Figure 4:
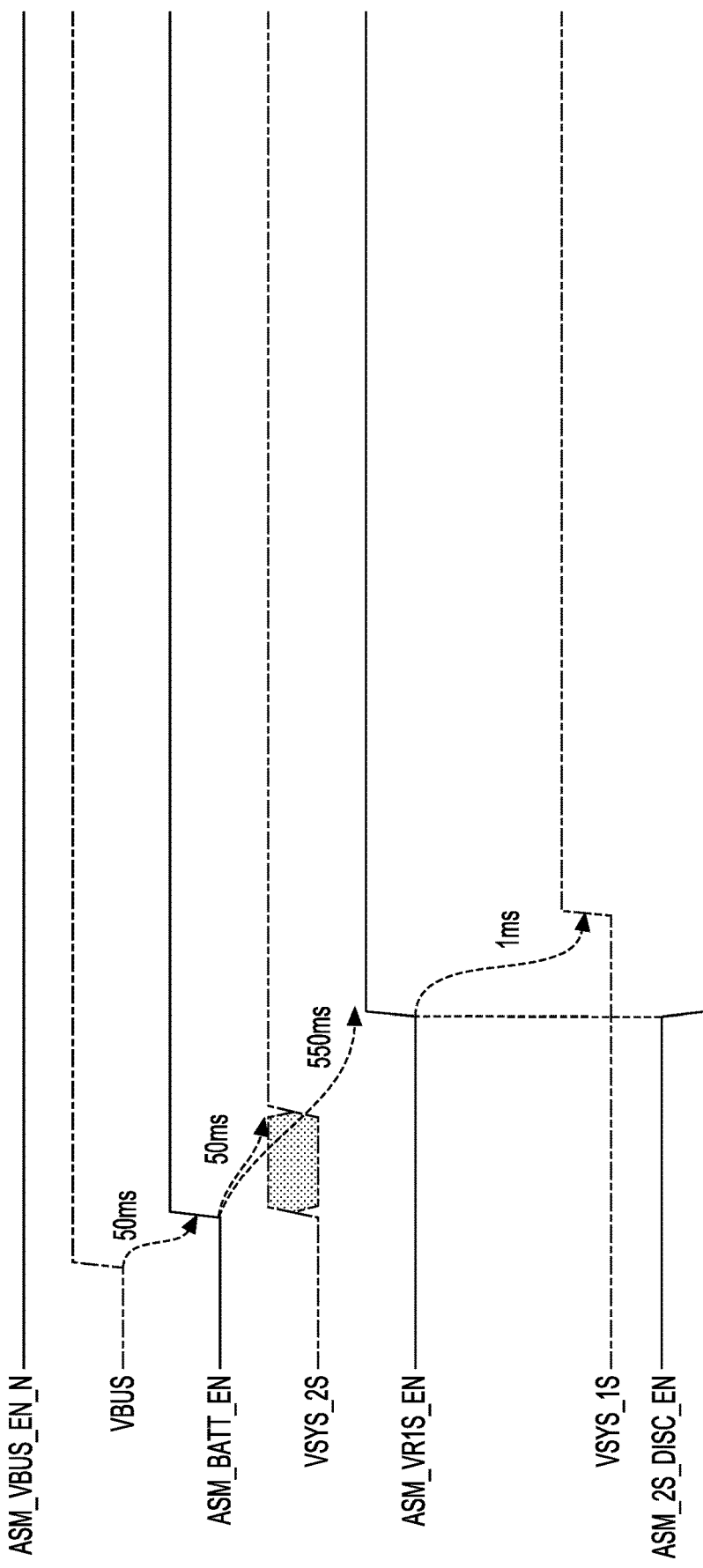
FIG. 4 shows an example timing diagram of the various signals associated with the transition of the ASM from out of the deep sleep state.

FIG. 4 shows an example timing diagram 400 of the various signals associated with the transition of ASM 110 from out of the deep sleep state (e.g., state 202 of FIG. 2) in response to the detection of an attachment of a power supply unit to the device. In this example, in response to a change in the status of the voltage (VBUS) provided by a power supply, ASM 110 may assert the ASM_BATT_EN signal to enable the battery pack associated with the device. As shown in FIG. 4, the ASM_BATT_EN signal may be asserted in about 50 ms. As part of this process, ASM 110 may monitor the status of the ASM_VBUS_EN_N signal as well to ensure that the process to exit deep sleep is not initiated if the ASM_VBUS_EN_N signal is asserted. After waiting a selected amount of time (e.g., 500 ms), if the battery voltage (VSYS_2S) is determined to be greater than a selected minimum voltage, then ASM 110 may assert the ASM_VR1S_EN signal to enable the voltage rail (VSYS_1S) for PMIC 150 and at the same time ASM 110 may disable the battery voltage discharger by de-asserting the ASM_2S_DISC_EN signal. Although not shown in FIG. 4, if after a wait of 500 ms, the battery voltage (VSYS_2S) does not exceed the selected minimum voltage, then ASM 110 may de-assert the ASM_BATT_EN signal and may keep the ASM_2S_DISC_EN signal asserted. Although FIG. 4 describes the signals by referring to certain selected time periods, shorter or longer time periods may be used.

Figure 5:
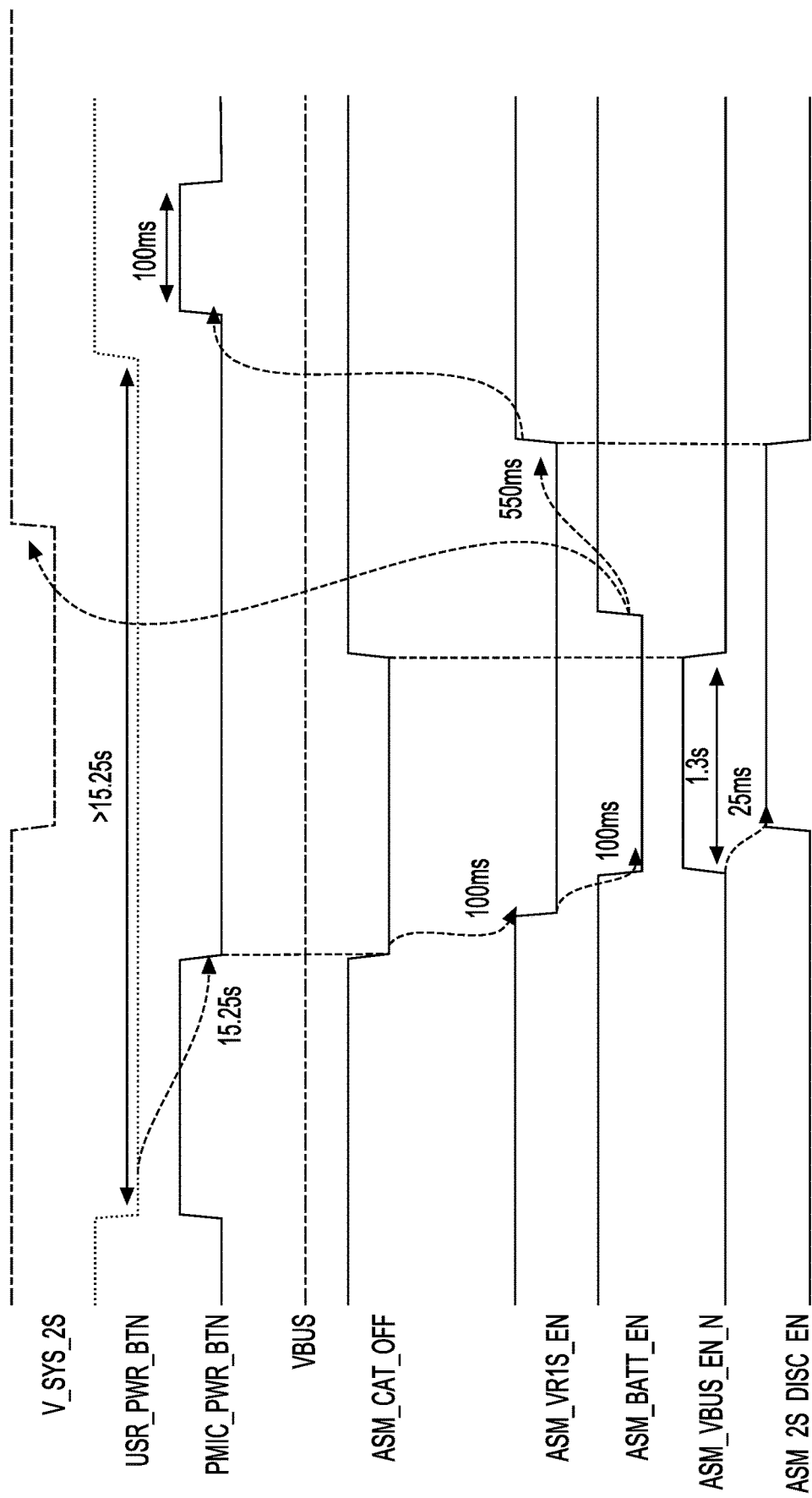
FIG. 5 shows an example timing diagram of the various signals associated with the ASM as a result of a hard reset (HRST)

FIG. 5 shows an example timing diagram 500 of the various signals associated with ASM 110 as a result of a hard reset (HRST). In this example, a hard reset may occur after an extended press of the user power button for a selected time (e.g., 15 seconds) as long as ASM 110 is not in the deep sleep state. Thus, as shown in FIG. 5, after approximately 15.25 seconds from the change in the USR_PWR_BTN, ASM 110 may de-assert the PMIC_PWR_BTN signal, which in turn lets PMIC 150 know that a hard reset has occurred. In this example, PMIC 150 is not handling the hard reset and only ASM 110 is configured to manage the hard reset sequence. This may be the case in at least two situations: (1) only ASM 110 is configured to manage the hard reset, or (2) PMIC 150 is not responsive and thus ASM 110 must address the hard reset. ASM 110 further de-asserts the ASM_CAT_OFF signal to inform PMIC 150 that the catastrophic condition that might have resulted in the user initiating the hard reset sequence is being addressed and thus PMIC 150 need not respond to the ASM_CAT_OFF signal. After waiting for a selected time (e.g., 100 ms), ASM 110 de-asserts the ASM_VR1S_EN signal to disable the voltage rail (VSYS_1S) for PMIC 150. After waiting for a selected time (e.g., 100 ms), ASM 110 may de-assert the ASM_BATT_EN signal to disable the battery pack. The 100 ms wait time may be selected such that there is enough time for the voltage rails to discharge. At the same time, ASM 110 may assert the signal ASM_VBUS_EN_N to ensure that if the power supply unit was connected to the device, it is prevented from supplying power to the device. In addition, ASM 110 may assert the ASM_2S_DISC_EN signal to enable the battery voltage discharge.

With continued reference to FIG. 5, ASM 110 may further, after an elapse of a selected time (e.g., 1.3 seconds) since the assertion of the ASM_VBUS_EN_N signal, allow a power supply unit to supply voltage to the device by de-asserting the ASM_VBUS_EN_N signal. In addition, ASM 110 may de-assert the ASM_CAT_OFF signal. After waiting a selected amount of time (e.g., 500 ms), if the battery voltage (VSYS_2S) is determined to be greater than a selected minimum voltage, then ASM 110 may assert the ASM_VR1S_EN signal to enable the voltage rail (VSYS_1S) for PMIC 150 and at the same time ASM 110 may disable the battery voltage discharger by de-asserting the ASM_2S_DISC_EN signal. In addition, around this time, ASM 110 may also assert the PMIC_PWR_BTN signal to convey to PMIC 150 that the device is now being powered on. In one example, at this stage PMIC 150 may take control of the power management functions. Although not shown in FIG. 5, if after a wait of 500 ms, the battery voltage (VSYS_2S) does not exceed the selected minimum voltage, then ASM 110 may de-assert ASM_BATT_EN signal and may keep the ASM_2S_DISC_EN signal asserted. Although FIG. 5 describes the signals by referring to certain selected time periods, shorter or longer time periods may be used. In addition, although FIG. 5 describes the user initiating the hard reset, the hard reset may also be initiated by software associated with the device. Thus, ASM 110 may automatically detect a hard reset and in response to the hard reset the ASM may automatically power down the device and then power up the device.

Figure 6:
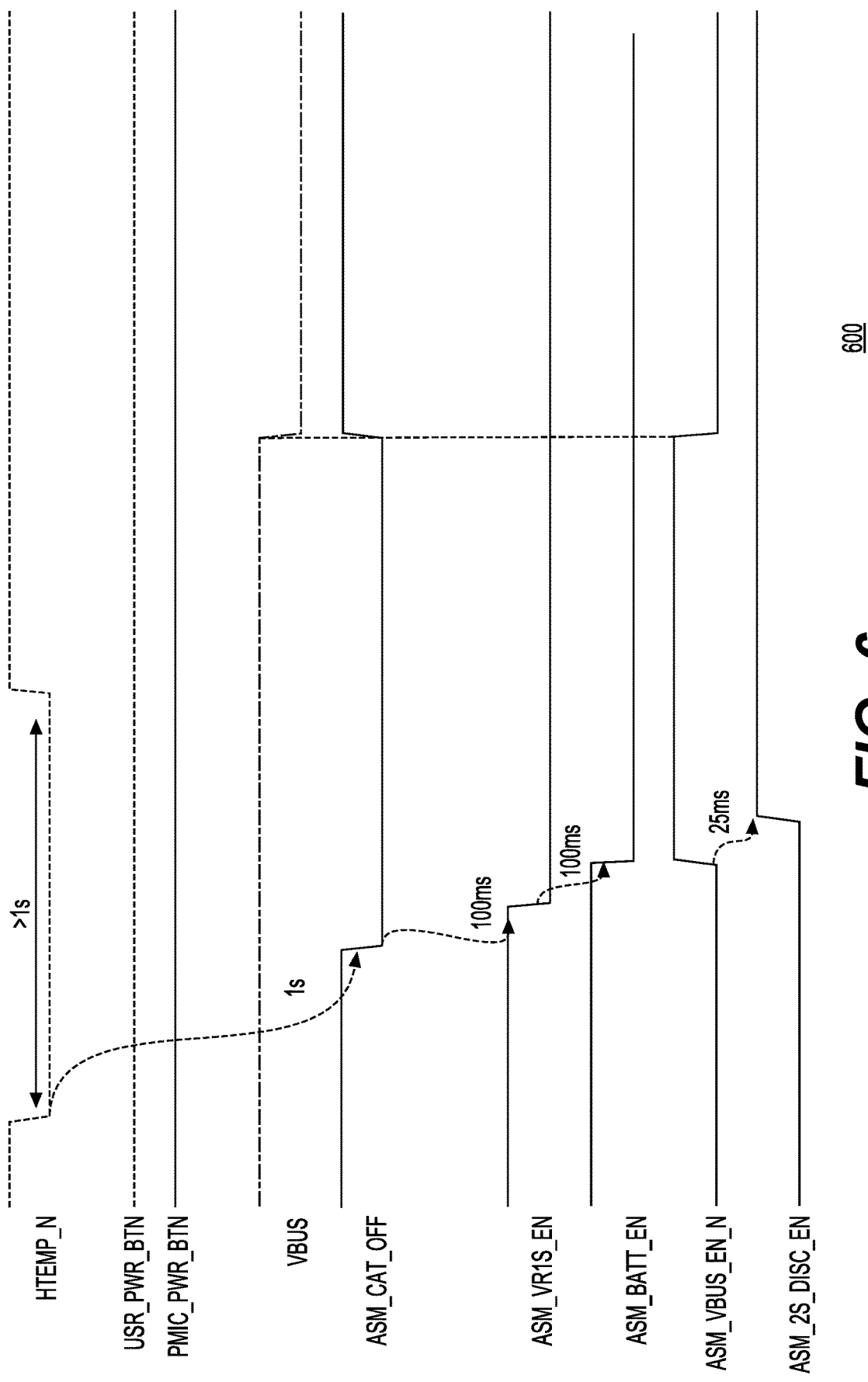
FIG. 6 shows an example timing diagram of the various signals associated with the ASM as a result of a detection of a high temperature condition.

FIG. 6 shows an example timing diagram 600 of the various signals associated with ASM 110 as a result of a detection of a high temperature condition. In one example, the high temperature condition may relate to a hotspot associated with the device exceeding a temperature threshold. In one example, the device may have another temperature condition associated with PMIC 150 that may have a lower temperature threshold. PMIC 150 may manage the lower threshold temperature condition. However, if PMIC 150 fails to manage the lower threshold temperature condition, then ASM 110 is configured to detect the higher threshold temperature condition and operate in a manner described with respect to timing diagram 600.

With continued reference to FIG. 6, in response to the HTEMP_N signal being de-asserted for a selected amount of time (e.g., 1 second), ASM 110 may assert the ASM_CAT_OFF signal to PMIC 150. After waiting for a selected amount of time (e.g., 100 ms), ASM 110 may de-assert the ASM_VR1S_EN signal to disable the voltage rail (VSYS_1S) for PMIC 150. After waiting for a selected amount of time (e.g., 100 ms), ASM 110 may de-assert the ASM_BATT_EN signal to disable the battery pack. In addition, ASM 110 may assert the ASM_VBUS_EN_N signal to prevent a power supply unit from providing any voltage (e.g., VBUS). After waiting for a selected amount of time (e.g., 25 ms), ASM 110 may assert the ASM_2S_DISC_EN signal to allow the battery voltage rail to discharge. Although FIG. 6 describes the signals by referring to certain selected time periods, shorter or longer time periods may be used. As an example, the high temperature condition may instead be another type of fault, such as an under-voltage or an excessive current draw by the device. In such situations, upon detection of any of these fault conditions, ASM 110 may perform similar steps as discussed with respect to timing diagram 600. Thus, ASM 110 may automatically detect a fault condition associated with the device and in response to detecting the fault condition the ASM may automatically initiate a power shut down sequence.

Figure 7:
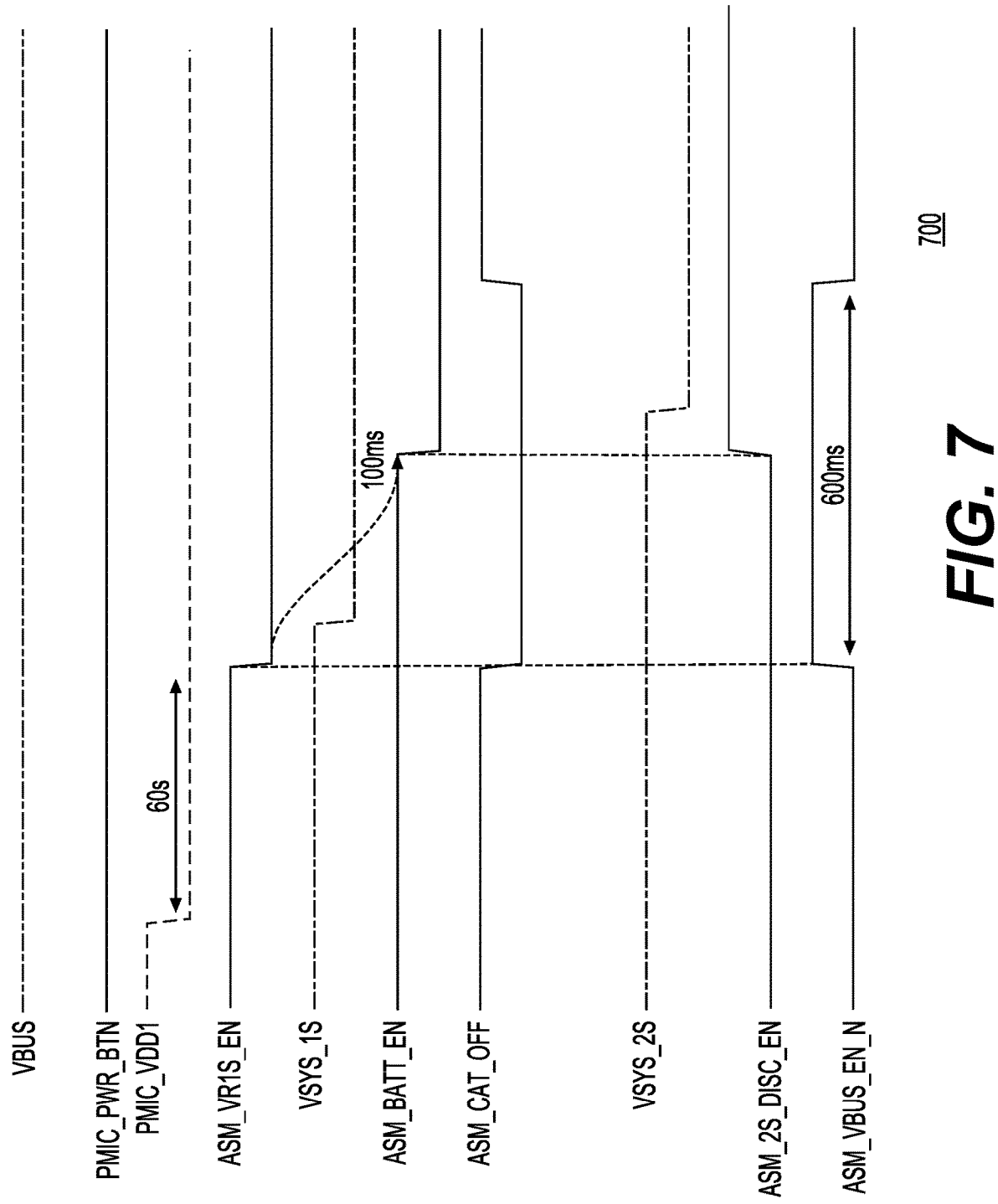
FIG. 7 shows an example timing diagram of the various signals associated with the transition of the ASM into the deep sleep state.

FIG. 7 shows an example timing diagram 700 of the various signals associated with the transition of ASM 110 into the deep sleep state (e.g., state 202 of FIG. 2) in response to no power supply attachment to the device and the loss of voltage being received by PMIC 150 for a selected time (e.g., 60 seconds). In response to these conditions being present, ASM 110 may de-assert the ASM_VR1S_EN signal to disable the voltage rail (VSYS_1S) for PMIC 150. At approximately the same time, ASM 110 may de-assert the ASM_CAT_OFF signal. In addition, at approximately the same time, ASM 110 may assert the ASM_VBUS_EN_N signal to prevent a power supply unit from providing any voltage (e.g., VBUS). After waiting for a selected time (e.g., 100 ms), ASM 110 may de-assert the ASM_BATT_EN signal to disable the battery pack and assert the ASM_2S_DISC_EN signal to allow the battery voltage rail to discharge. As shown in FIG. 7, ASM 110 is configured to put the device into the deep sleep only when VBUS is zero and thus no power supply is attached to the device. Although FIG. 7 describes the signals by referring to certain selected time periods, shorter or longer time periods may be used.

Figure 8:
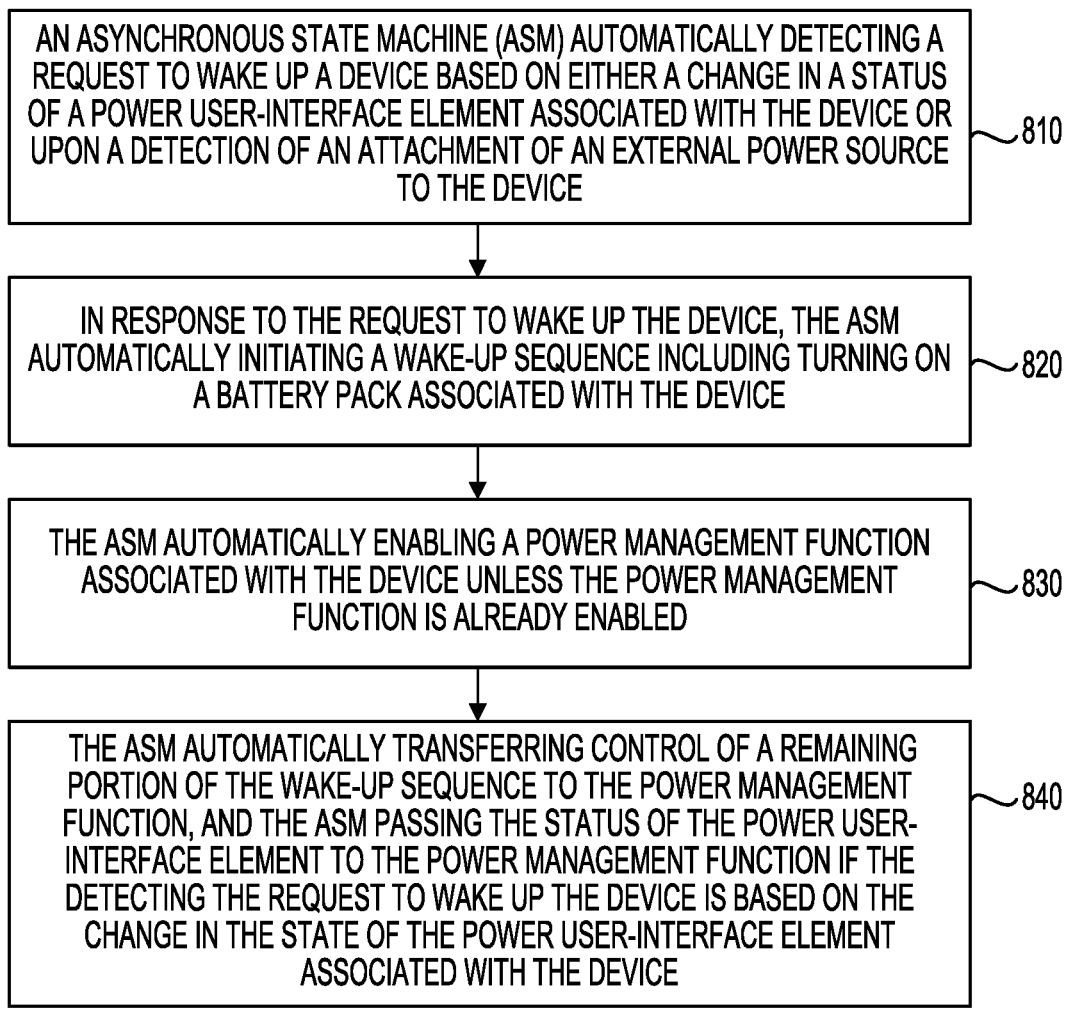
FIG. 8 shows a flowchart of a method for waking up a device from a deep sleep state using a hardware-implemented asynchronous state machine associated with the device in accordance with one example.

FIG. 8 shows a flowchart of a method for waking up a device from a deep sleep state using a hardware-implemented asynchronous state machine (e.g., ASM 110) associated with the device in accordance with one example. In step 810, ASM 110 may automatically detect a request to wake up the device based on either a change in a status of a power user-interface element associated with the device or upon a detection of an attachment of an external power source to the device. In this example, this relates to the transition ASM 110 from out of the deep sleep state (e.g., state 202). In one example, this step may be performed by ASM 110 as described with respect to timing diagram 300 of FIG. 3 and timing diagram 400 of FIG. 4. Thus, if the request to wake up the device is a result of a user pressing the power button (or a similar command received via another interface), the timing diagram 300 of FIG. 3 shows the signals associated with a response to this event. On the other hand, if the request to wake up is based on a detection of the attachment of a power supply unit, then the timing diagram 400 of FIG. 4 shows the signals associated with this event.

In step 820, in response to the request to wake up the device, ASM 110 may automatically initiate a wake-up sequence including turning on a battery pack associated with the device. In one example, as part of this step, as shown in both timing diagrams 300 and 400, ASM 110 may assert the ASM_BATT_EN signal to turn on the battery pack associated with the device.

In step 830, ASM 110 may automatically enable a power management function associated with the device unless the power management function is already enabled. In this example, the power management function may be PMIC 150. In this example, ASM 110 may perform this function by asserting the ASM_VR1S_EN signal, which may enable the power supply voltage to PMIC 150.

In step 840, ASM 110 may automatically transfer control of a remaining portion of the wake-up sequence to the power management function, and the ASM may pass the status of the power user-interface element to the power management function if detecting the request to wake up the device is based on the change in the state of the power user-interface element associated with the device. As explained earlier with respect to timing diagram 300 of FIG. 3, ASM 110 may pass the status of USR_PWR_BTN signal by asserting the PMIC_PWR_BTN signal. Although FIG. 8 shows certain steps being performed in a certain order, additional or fewer steps may be performed in a different order. As an example, additional steps described with respect to timing diagrams 300 and 400 may be performed by ASM 110.

Figure 9:
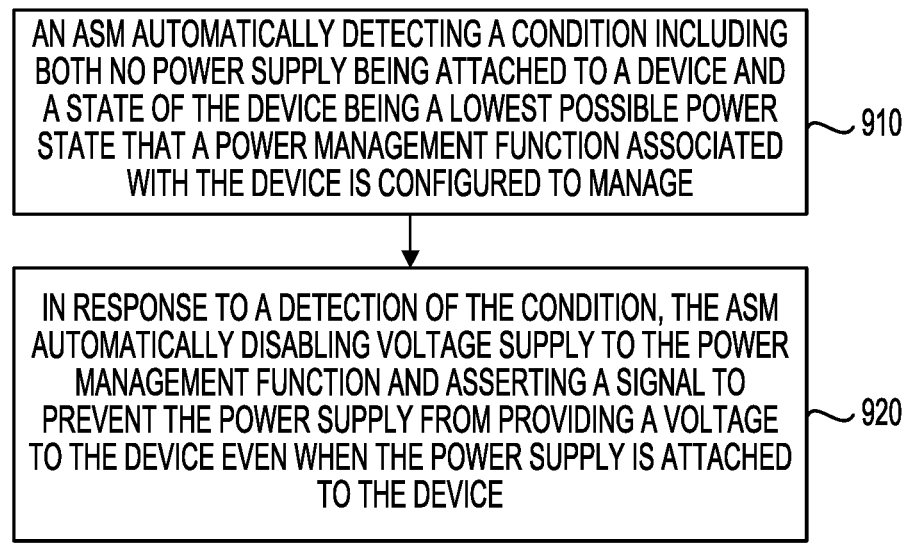
FIG. 9 shows a flowchart of a method for entering a deep sleep state using a hardware-implemented asynchronous state machine associated with a device in accordance with one example.

FIG. 9 shows a flowchart of a method for entering a deep sleep state using a hardware-implemented asynchronous state machine (e.g., ASM 110) associated with a device in accordance with one example. In step 910, ASM 110 may automatically detect a condition including both no power supply being attached to the device and a state of the device being a lowest possible power state that a power management function associated with the device is configured to manage. In one example, the signals associated with this step are explained with respect to timing diagram 700 of FIG. 7. Thus, in this example, ASM 110 may automatically detect this condition in response to no power supply attachment to the device and the loss of voltage being received by PMIC 150 for a selected time (e.g., 60 seconds). In addition, ASM 110 may automatically detect this condition by monitoring the voltage level on a voltage rail associated with the power management function. As an example, the voltage level PMIC_VDD1 may be monitored and its being close to zero may be concomitant with the lowest possible power state that the power management function (e.g., PMIC 150) is configured to manage for the device.

In step 920, in response to the detection of the condition described with respect to step 910, the ASM may automatically disable the voltage supply to the power management function and assert a signal to prevent the power supply from providing a voltage to the device even when the power supply is attached to the device. In one example, as described with respect to timing diagram 700, ASM 110 may de-assert the ASM_VR1S_EN signal to disable the voltage rail (VSYS_1S) for PMIC 150. In addition, at approximately the same time, ASM 110 may assert the ASM_VBUS_EN_N signal to prevent a power supply unit from providing any voltage (e.g., VBUS). Although FIG. 9 shows certain steps being performed in a certain order, additional or fewer steps may be performed in a different order. As an example, additional steps described with respect to timing diagram 700 may be performed by ASM 110.

In conclusion, in one example, the present disclosure relates to a method for waking up a device from a deep sleep state using an asynchronous state machine (ASM) associated with the device. The method may include the ASM automatically detecting a request to wake up the device based on either a change in a status of a power user-interface element associated with the device or upon a detection of an attachment of an external power source to the device. The method may further include in response to the request to wake up the device, the ASM automatically initiating a wake-up sequence including turning on a battery pack associated with the device. The method may further include the ASM automatically detecting whether a power management function associated with the device is enabled and if the power management function is not enabled then the ASM enabling the power management function. The method may further include the ASM automatically transferring control of a remaining portion of the wake-up sequence to the power management function and the ASM passing the status of the power user-interface element to the power management function if the detecting the request to wake up the device is based on the change in the state of the power user-interface element associated with the device.

In the deep sleep state, the device may be configured to receive power for only the ASM and a real-time clock generating circuit associated with the device. The method may further include the ASM automatically detecting the request to wake up the device based on a hardware reset of the device.

The power management function may comprise a power management integrated circuit. The ASM may be implemented with logic gates and a programmable state machine in a one-time programmable mixed-signal integrated circuit. The ASM may comprise a programmable array logic (PAL), a complex programmable logic device (CPLD), or a field programmable gate array (FPGA). The method may further include after the completion of the wake-up sequence, the ASM automatically entering the deep sleep state.

In another example, the present disclosure relates to an asynchronous state machine (ASM) associated with a device, the ASM configured to wake up the device from a deep sleep state. The ASM may further be configured to automatically detect a request to wake up the device based on either a change in a status of a power user-interface element associated with the device or upon a detection of an attachment of an external power source to the device. The ASM may further be configured to, in response to the request to wake up the device, automatically initiate a wake-up sequence including turning on a battery pack associated with the device. The ASM may further be configured to automatically detect whether a power management function associated with the device is enabled and if the power management function is not enabled then enable the power management function. The ASM may further be configured to automatically transfer control of a remaining portion of the wake-up sequence to the power management function and pass the status of the power user-interface element to the power management function if the detecting the request to wake up the device is based on the change in the state of the power user-interface element associated with the device.

In the deep sleep state, the device may be configured to receive power for only the ASM and a real-time clock generating circuit associated with the device. The ASM may further be configured to automatically detect the request to wake up the device based on a hardware reset of the device.

The power management function may comprise a power management integrated circuit. The ASM may be implemented with logic gates and a programmable state machine in a one-time programmable mixed-signal integrated circuit. The ASM may comprise a programmable array logic (PAL), a complex programmable logic device (CPLD), or a field programmable gate array (FPGA). The ASM may further be configured to, after the completion of the wake-up sequence, automatically enter the deep sleep state.

In yet another example, the present disclosure relates to a method entering a deep sleep state using an asynchronous state machine (ASM) associated with a device. The method may further include the ASM automatically detecting a condition including both no power supply being attached to the device and a state of the device being a lowest possible power state that a power management function associated with the device is configured to manage. The method may further include, in response to a detection of the condition, the ASM automatically disabling voltage supply to the power management function and asserting a signal to prevent the power supply from providing a voltage to the device even when the power supply is attached to the device.

The method may further include the ASM automatically detecting a fault condition associated with the device and in response to detecting the fault condition the ASM automatically initiating a power shut down sequence. The method may further include the ASM automatically detecting a hard reset and in response to the hard reset the ASM automatically powering down the device and then powering up the device.

In the deep sleep state, the device may be configured to receive power for only the ASM and a real-time clock generating circuit associated with the device. The power management function may comprise a power management integrated circuit. The ASM may be implemented with logic gates and a programmable state machine in a one-time programmable mixed-signal integrated circuit.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for waking up a device from a deep sleep state using an asynchronous state machine (ASM) associated with the device, the method comprising:
    the ASM automatically detecting a request to wake up the device based on either a change in a status of a power user-interface element associated with the device or upon a detection of an attachment of an external power source to the device;
    in response to the request to wake up the device, the ASM automatically initiating a wake-up sequence including turning on a battery pack associated with the device;
    the ASM automatically detecting whether a power management function associated with the device is enabled and if the power management function is not enabled then the ASM enabling the power management function; and
    the ASM automatically transferring control of a remaining portion of the wake-up sequence to the power management function and the ASM passing the status of the power user-interface element to the power management function if the detecting the request to wake up the device is based on the change in the state of the power user-interface element associated with the device.

2. The method of claim 1, wherein during the deep sleep state, receiving power for only the ASM and a real-time clock generating circuit associated with the device.

3. The method of claim 1 further comprising the ASM automatically detecting the request to wake up the device based on a hardware reset of the device.

4. The method of claim 1, wherein the power management function comprises a power management integrated circuit.

5. The method of claim 1, wherein the ASM is implemented with logic gates and a programmable state machine in a one-time programmable mixed-signal integrated circuit.

6. The method of claim 1, wherein the ASM comprises a programmable array logic (PAL), a complex programmable logic device (CPLD), or a field programmable gate array (FPGA).

7. The method of claim 1 further comprising, after the completion of the wake-up sequence, the ASM automatically entering the deep sleep state.

8. A system comprising a power management integrated circuit (PMIC) and an asynchronous state machine (ASM) associated with a device, the ASM configured to wake up the device from a deep sleep state, the ASM further configured to:
- automatically detect a request to wake up the device based on either a change in a status of a power user-interface element associated with the device or upon a detection of an attachment of an external power source to the device;
- in response to the request to wake up the device, automatically initiate a wake-up sequence including turning on a battery pack associated with the device;
- automatically detect whether a power management function associated with the device is enabled and if the power management function is not enabled then enable the power management function; and
- automatically transfer control of a remaining portion of the wake-up sequence to the power management function and pass the status of the power user-interface element to the power management function if the detecting the request to wake up the device is based on the change in the state of the power user-interface element associated with the device.

9. The system of claim 8, wherein during the deep sleep state the ASM is further configured to receive power for only the ASM and a real-time clock generating circuit associated with the device.

10. The system of claim 8, wherein the ASM is further configured to automatically detect the request to wake up the device based on a hardware reset of the device.

11. The system of claim 8, wherein the power management function comprises a power management integrated circuit.

12. The system of claim 8, wherein the ASM is implemented with logic gates and a programmable state machine in a one-time programmable mixed-signal integrated circuit.

13. The system of claim 8, wherein the ASM comprises a programmable array logic (PAL), a complex programmable logic device (CPLD), or a field programmable gate array (FPGA).

14. The system of claim 8, wherein the ASM is further configured to, after the completion of the wake-up sequence, automatically enter the deep sleep state.

15. A method for entering a deep sleep state using an asynchronous state machine (ASM) associated with a device, the method comprising:
- the ASM automatically detecting a condition including both no power supply being attached to the device and a state of the device being a lowest possible power state that a power management function associated with the device is configured to manage; and
- in response to a detection of the condition, the ASM automatically disabling voltage supply to the power management function and asserting a signal to prevent the power supply from providing a voltage to the device even when the power supply is attached to the device.

16. The method of claim 15 further comprising the ASM automatically detecting a fault condition associated with the device and in response to detecting the fault condition the ASM automatically initiating a power shut down sequence.

17. The method of claim 15 further comprising the ASM automatically detecting a hard reset and in response to the hard reset the ASM automatically powering down the device and then powering up the device.

18. The method of claim 15, wherein during the deep sleep state, receiving power for only the ASM and a real-time clock generating circuit associated with the device.

19. The method of claim 15, wherein the power management function comprises a power management integrated circuit.

20. The method of claim 15, wherein the ASM is implemented with logic gates and a programmable state machine in a one-time programmable mixed-signal integrated circuit.

* * * * *